(12) United States Patent
Wang et al.

(10) Patent No.: US 11,876,649 B2
(45) Date of Patent: Jan. 16, 2024

(54) HYBRID ANALOG/DIGITAL EQUALIZER ARCHITECTURE FOR HIGH-SPEED RECEIVER

(71) Applicant: Marvell Asia Pte Ltd, Singapore (SG)

(72) Inventors: Luke Wang, San Jose, CA (US); Benjamin Smith, Ottawa (CA); Basel Alnabulsi, Ottawa (CA); Stephane Dallaire, Gatineau (CA); Simon Forey, Earls Barton (GB); Karthik Raviprakash, San Jose, CA (US); Praveen Prabha, Lake Forest, CA (US); Benjamin T. Reyes, Cordoba (AR)

(73) Assignee: Marvell Asia Pte Ltd, Singapore (SG)

( * ) Notice: Subject to any disclaimer, the term of this patent is extended or adjusted under 35 U.S.C. 154(b) by 22 days.

(21) Appl. No.: 17/648,440

(22) Filed: Jan. 20, 2022

(65) Prior Publication Data
US 2023/0037860 A1 Feb. 9, 2023

Related U.S. Application Data

(60) Provisional application No. 63/230,530, filed on Aug. 6, 2021.

(51) Int. Cl.
*H04L 25/03* (2006.01)
*H04L 25/02* (2006.01)

(52) U.S. Cl.
CPC .... *H04L 25/03076* (2013.01); *H04L 25/0232* (2013.01); *H04L 2025/03433* (2013.01); *H04L 2025/03605* (2013.01)

(58) Field of Classification Search
CPC ......... H04L 25/03019; H04L 25/03057; H04L 25/03076; H04L 25/0232;
(Continued)

(56) References Cited

U.S. PATENT DOCUMENTS 9,461,851 B1 * 10/2016 Liao .................. H04L 25/03885
9,467,315 B2 10/2016 Dallaire et al.
(Continued)

OTHER PUBLICATIONS

Tabasy et al. "A 6b 10GS/s TI-SAR ADC with Embedded 2-Tap FFE/1-Tap DFE in 65nm CMOS", Aug. 15, 2013 (added to IEEEXplore), pp. 1-2, 2013 Symposium on VLSI Circuits Digest of Technical Papers. (Year: 2013).*
(Continued)

*Primary Examiner* — Sophia Vlahos

(57) ABSTRACT

Equalization circuitry for a data channel in an integrated circuit device includes an analog equalization stage coupled to the data channel, and a digital signal processing stage downstream of the analog equalization stage. The digital signal processing stage generates control signals to control the analog equalization stage, and includes a digital equalization stage that operates on output of the analog equalization stage. The analog equalization stage may further include an enhanced processing stage for optical signals, which may be selectably coupled to the analog equalization stage. The analog equalization stage may include at least one feedforward or feedback equalization stage, and a decision stage that outputs decision signals at one of a first plurality of signal levels. The enhanced processing stage operates on the decision signals to output enhanced decision signals at one of a second plurality of signal levels of higher resolution than the first plurality of signal levels.

17 Claims, 9 Drawing Sheets

(58) Field of Classification Search
CPC .......... H04L 2025/03433; H04L 2025/03605; H04B 10/6971
See application file for complete search history.

(56) References Cited

U.S. PATENT DOCUMENTS

| | | | |
|---|---|---|---|
| 9,806,915 B1* | 10/2017 | Elzeftawi | H04L 25/03019 |
| 11,218,225 B1 | 1/2022 | Alnabulsi | |
| 2002/0181573 A1* | 12/2002 | Dohmen | H04L 25/063 |
| | | | 375/232 |
| 2005/0127993 A1* | 6/2005 | Yim | H03G 3/3036 |
| | | | 330/133 |
| 2009/0086806 A1* | 4/2009 | Hwang | H04L 25/03006 |
| | | | 375/232 |
| 2019/0305992 A1* | 10/2019 | Vegas Olmos | H04L 27/06 |
| 2021/0006439 A1* | 1/2021 | Li | H04L 25/4917 |
| 2022/0182266 A1* | 6/2022 | Xavier | H04L 25/0296 |

OTHER PUBLICATIONS

Kiran, S., et al., "A 52-GB/s ADC-based PAM-4 Receiver With Comparator-Assisted 2-bit/Stage SAR ADC and Partially Unrolled DFE in 65-nm CMOS," *IEEE Journal of Solid-State Circuits*, 54(3):659-671 (2019).

* cited by examiner

HYBRID ANALOG/DIGITAL EQUALIZER ARCHITECTURE FOR HIGH-SPEED RECEIVER

CROSS REFERENCE TO RELATED APPLICATION

This disclosure claims the benefit of commonly-assigned U.S. Provisional Patent Application No. 63/230,530, filed Aug. 6, 2021, which is hereby incorporated by reference herein in its entirety.

FIELD OF USE

This disclosure relates to equalizers for high-speed data receivers. More particularly, this disclosure relates to hybrid analog/digital equalizers that can support wireline or optical signals with both feed-forward equalization and decision-feedback equalization.

BACKGROUND

The background description provided herein is for the purpose of generally presenting the context of the disclosure. Work of the inventors hereof, to the extent that that work is described in this background section, as well as aspects of the description that may not otherwise qualify as prior art at the time of filing, are neither expressly nor impliedly admitted to be prior art against the subject matter of the present disclosure.

Analog receivers, particularly those used for multi-level signaling, such as N-level pulse amplitude modulation (PAM-N), a common example of which is PAM-4 (which uses four signal levels), or Non-Return-to-Zero (NRZ) signaling (which uses two signal levels and is sometimes referred to as PAM-2), typically include analog equalizers to equalize signal impairments such as frequency-dependent loss, reflection, baseline wander, and other impairments.

SUMMARY

In accordance with implementations of the subject matter of this disclosure, equalization circuitry for a data channel in an integrated circuit device includes an analog equalization stage coupled to the data channel, and a digital signal processing stage downstream of the analog equalization stage, the digital signal processing stage being configured to generate control signals to control the analog equalization stage, and including a digital equalization stage configured to operate on output of the analog equalization stage.

In a first implementation of such equalization circuitry, the analog equalization stage may further include an enhanced processing stage for optical signals.

According to a first aspect of that first implementation, the enhanced processing stage for optical signals may be selectably coupled to the analog equalization stage.

In an instance of that first aspect of the first implementation, selectable coupling of the enhanced processing stage for optical signals to the analog equalization stage may include metallization in the integrated circuit device.

According to a second aspect of that first implementation, the analog equalization stage may include at least one feed-forward or feedback equalization stage, and a decision stage that outputs decision signals at one of a first plurality of signal levels, and the enhanced processing stage for optical signals operates on the decision signals to output enhanced decision signals at one of a second plurality of signal levels, the second plurality of signal levels being of higher resolution than the first plurality of signal levels.

In an instance of that second aspect, the at least one feed-forward or feedback equalization stage may include an analog feed-forward equalization stage and an analog decision-feedback equalization stage.

In a second implementation of such equalization circuitry, the analog equalization stage may include interleaver circuitry configured to disperse incoming signals to a plurality of interleaved equalization blocks. Each interleaved equalization block in the plurality of equalization blocks may include a feed-forward equalization stage, a decision-feedback equalization stage and a decision stage, and at least one of (1) the incoming signals and (2) outputs of at least one of the feed-forward equalization stage and the decision stage, may be configured to be input as at least one of (a) precursors to a feed-forward equalization stage of a first other interleaved equalization block in the plurality of equalization blocks, (b) post-cursors to a feed-forward equalization stage of a second other interleaved equalization block in the plurality of equalization blocks, and (c) post-cursors to a decision-feedback equalization stage of a third other interleaved equalization block in the plurality of equalization blocks.

According to a first aspect of that second implementation, each interleaved equalization block in the plurality of equalization blocks may include a variable gain amplifier configured to compensate for DC loss associated with the feed-forward equalization stage.

According to a first aspect of that second implementation, each respective interleaved equalization block in the plurality of equalization blocks may include a probe slicer configured to output estimated signal properties for use by the digital signal processing stage, the estimated signal properties excluding effects of analog circuitry in the respective interleaved equalization block.

According to a third aspect of that second implementation, the equalization circuitry may further include an analog front end upstream of the interleaver circuitry, and feedback circuitry configured to correct DC offset at the analog front end.

In an instance of that third aspect, the feedback circuitry may include a low-bandwidth feedback loop from output of the analog front end to input of the analog front end, and a high-bandwidth feedback loop from an output downstream of the decision stage to input of the analog front end.

According to implementations of the subject matter of this disclosure, a method of equalization of signals on a data channel in an integrated circuit device includes performing analog equalization on the signals on the data channel, and performing digital signal processing on output of the analog equalization, the digital signal processing including generating control signals to control the analog equalization and also including digital equalization.

In a first implementation of such a method, performing analog equalization may further include performing additional equalization when the signals on the data channel are optical signals.

According to a first aspect of that first implementation, performing analog equalization may include performing at least one feed-forward or feedback equalization, and outputting decision signals at one of a first plurality of signal levels, and performing additional equalization may include operating on the decision signals to output enhanced decision signals at one of a second plurality of signal levels, the second plurality of signal levels being of higher resolution than the first plurality of signal levels.

In a first instance of that first aspect of the first implementation, performing at least one feed-forward or feedback equalization may include performing feed-forward equalization and performing decision-feedback equalization.

A variant of that first instance may further include amplifying output of the feed-forward equalization to compensate for DC loss associated with the feed-forward equalization.

A second implementation of such a method may include interleaving incoming signals to a plurality of interleaved equalization blocks, performing, on signals in each interleaved equalization block in the plurality of equalization blocks, feed-forward equalization and decision-feedback equalization, and outputting equalization signals, and inputting at least one of (1) the incoming signals and (2) the output equalization signals as inputs to at least one of (a) precursors to feed-forward equalization in a first other interleaved equalization block in the plurality of equalization blocks, (b) post-cursors to feed-forward equalization in a second other interleaved equalization block in the plurality of equalization blocks, and (c) post-cursors to decision-feedback equalization in a third other interleaved equalization block in the plurality of equalization blocks.

According to a first aspect of that second implementation, such a method may further include estimating, in each respective interleaved equalization block in the plurality of equalization blocks, estimated signal properties for use in the digital signal processing, the estimated signal properties excluding effects of analog processing in the respective interleaved equalization block.

According to a second aspect of that second implementation, such a method may further include using feedback to correct DC offset of an analog front end upstream of the interleaved equalization blocks.

In a first instance of that second aspect, using feedback may include feeding back low-bandwidth signals from output of the analog front end to input of the analog front end to correct device-mismatch-induced DC offset in the analog front end, and feeding back high-bandwidth signals from downstream of the decision signals to input of the analog front end to correct offset caused by one or both of baseline wander and low-frequency impairment.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

Figure 1:
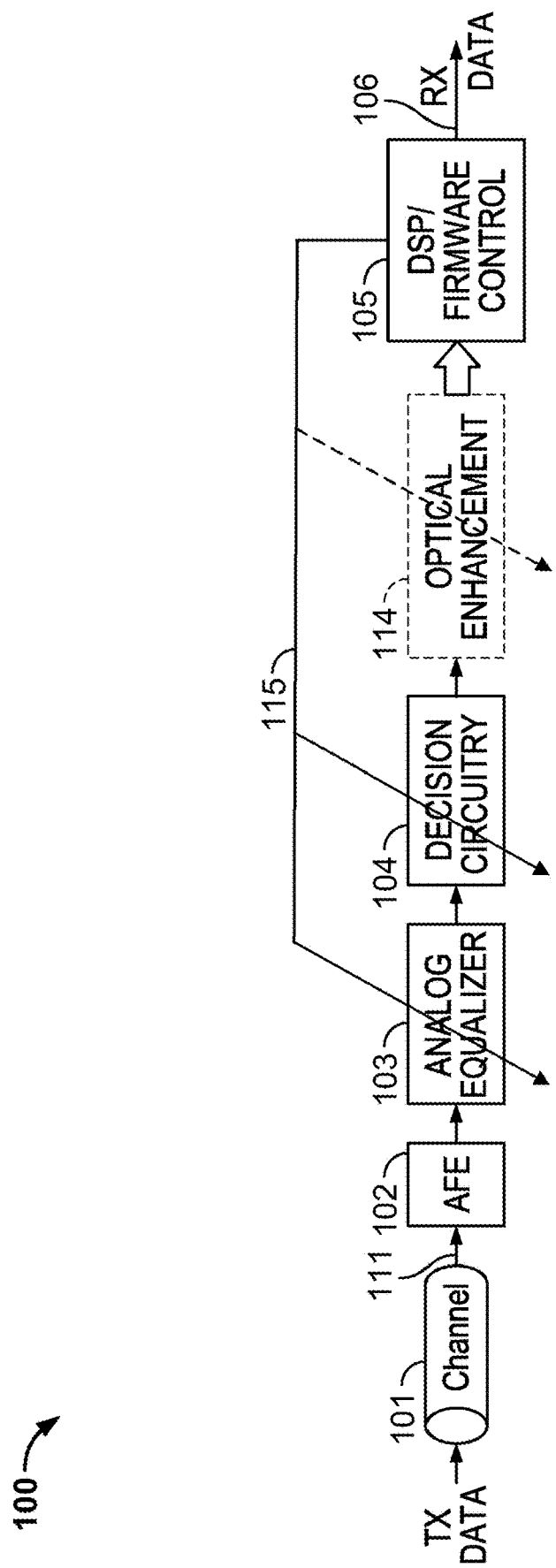
FIG. 1 is a high-level representation of an implementation of a hybrid analog/digital equalizer incorporated in an integrated circuit wireline or optical receiver in accordance with the subject matter of this disclosure.

In accordance with implementations of the subject matter of this disclosure, an integrated circuit receiver for wireline or optical data channels using multi-level signaling—e.g., PAM-N (including PAM-2 or NRZ which uses two levels, PAM-4 which uses four levels, as well as PAM-6, PAM-8, etc.) or duo-binary signaling—includes an analog portion and a digital portion that operates on the output of the analog portion. The digital portion also provides control signals for calibration and adaptation of the analog portion, which includes analog equalizer circuitry.

The analog portion includes an analog front-end and the analog equalizer circuitry, as well as decision circuitry, which may include one or more slicers and which functions as a multi-bit analog-to-digital converter (ADC). The analog portion also may include enhanced processing for optical channels, as described in more detail below. It may be possible for activation of the enhanced processing for optical channels to be controllable by a user setting, or even by a run-time command, that writes a value into an appropriate register. However, in some implementations, the circuitry for the enhanced processing for optical channels may always be present in semiconductor layers of the integrated circuit device incorporating the receiver, but a decision to activate the circuitry for enhanced processing for optical channels is made at the time of manufacture, by making appropriate connections in metallization layers of the integrated circuit device incorporating the receiver.

The analog front-end may itself include an equalization function, such as a continuous-time linear equalizer (CTLE) configured to compensate for frequency-dependent loss on the channel. The CTLE may be implemented using a 1-zero, 2-poles equalizer, or a more complex equalizer such as a 2-zeroes, 3-poles equalizer. In one implementation, a 1-zero, 2-poles CTLE provides 0 dB to 6 dB of boost or gain and can be adjusted to change the frequency boost profile, including adjustment of zero location and of amount of peaking.

The analog front-end may also include a variable-gain amplifier following the CTLE. The amount of gain added by the variable-gain amplifier may depend on the CTLE parameters. Moreover, the CTLE itself may be optional. As in the case of the enhanced optical equalization circuitry, activation of the CTLE may be controllable by a user setting or even by a run-time command in some implementations, while in other implementations, a decision to activate the CTLE is made at the time of manufacture, by making appropriate connections in metallization layers of the integrated circuit device incorporating the receiver. In one implementation where the CTLE is in use, the variable gain amplifier provides 0 dB to 6 dB of gain. If the CTLE is not in use, the amount of gain needed from the variable-gain amplifier may be different. The CTLE typically is needed for electrical channels, but normally would not be needed for optical channels.

Following the analog front-end is a time-interleaved analog equalization stage including feed-forward equalization (FFE) circuitry and decision-feedback equalization (DFE) circuitry. This time-interleaved equalization stage includes a plurality (e.g., sixteen) of identical blocks ("slices" or "interleaves") of equalization circuitry in parallel. Suitable time delays between the interleaves, set by the clock phases driving the sampling/track-and-hold switches, allow outputs to be used in the current interleave to serve as inputs to FFE circuitry in the current interleaves and in subsequent interleaves. This allows analog equalization of precursor inter-symbol interference (ISI) and post-cursor ISI, where precursors correspond to samples taken from interleaves that are later in time and post-cursors correspond to samples taken from interleaves that are earlier in time. In one implementation, for example, there may be 16 interleaves, and the FFE circuitry may have 10 taps, using the current interleave (cursor), 3 precursors, and 6 post-cursors.

In order to compensate for DC loss introduced by the FFE circuitry, a second variable gain amplifier may be provided between the FFE circuitry and the DFE circuitry. In one implementation, the second variable gain amplifier has a gain range of 0 dB to 9 dB, and is designed to provide at least 40 dB of linearity across the entire gain range using multiple degeneration devices, as described in commonly-assigned U.S. patent application Ser. No. 17/210,080, filed Mar. 23, 2021, which is hereby incorporated by reference herein in its entirety.

The output of the second variable-gain amplifier may be used as the summation point of the DFE. In some implementations, the DFE may have D=12 taps to equalize twelve post-cursors (e.g., form the $7^{th}$ post-cursor to the $18^{th}$ post-cursor). A source-follower buffer may drive the decision devices which follow the DFE and whose digital outputs are fed back to the DFE summation node. The source-follower buffer helps decouple the summing node, which has a high gain requirement, from the large input capacitive load of the decision devices.

The decision devices include at least one slicer. However, in some embodiments, for four-level signal detection, such as in PAM-4, three data slicers (−2, 0, +2) and four error slicers (−3, −1, +1, +3) are used to slice at the desired thresholds. Although one error slicer may be sufficient in some implementations, using four error slicers allows high-bandwidth baud-rate timing recovery. Using multiple error slicers may also speed up adaptation of the FFE, DFE and other feedback loops described below.

The error slicers may be adapted using a decision-directed loop, which sets the corresponding slicer level at the 50th percentile of the conditional error distribution (e.g., conditioned on the PAM-4 data decision). The data slicers may be adapted offline using a calibration slicer as described in commonly-assigned U.S. Pat. No. 9,467,315, which is hereby incorporated by reference herein in its entirety, to determine the signal level at which the probabilities, under the tails of neighboring PAM-4 levels, are equal, within a programmable amplitude range from the signal level to be adapted.

In two-level signaling, such as NRZ signaling, two error slicers may be sufficient, and all data slicers can be set to the same threshold to slice the center of the data eye.

Where four error slicers are used, the presence of the four error slicers enables the implementation of an optional data path for optical enhancement as referred to above and described in more detail below. Alternatively, unused data slicers can be turned-off.

Each interleave may also include a probe slicer immediately after the interleaver sampling point. The probe slicer outputs can be processed by the digital signal processor (DSP) in the digital portion (see below), to estimate properties of the signal before the signal can be affected by the various gain stages of the analog filter circuitry in the interleave. Such properties include, for example and without limitation, amplitude of the signal envelope, inter-symbol interference (i.e., pulse and frequency responses), signal-to-noise ratio, and sampling time skew between interleaves. That information allows the DSP to independently optimize the various portions of the analog filter stage. The probe slicer, if present, can be implemented as a single-bit slicer with a programmable threshold voltage. To estimate signal properties, the DSP may control the probe slicer threshold and post-process the probe slicer outputs. In some instances, the DSP may process the probe slicer outputs together with the data and error slicer outputs. For example, the amplitude of the signal envelope can be determined by digitally accumulating the probe slicer output at each of a range of probe slicer thresholds, and equating the amplitude of the signal envelope to the probe slicer threshold at which a targeted accumulation total is observed.

If the optical enhancement mode is activated, it may be used to provide additional resolution—i.e., additional signal levels between the N levels of the multilevel signaling that is in use. Specifically, the PAM-4 decision devices function as the equivalent of a non-uniformly quantizing 3-bit analog-to-digital converter (ADC). The levels may or may not be uniformly spaced, depending on whether there is non-linearity in the eye. The optical enhancement mode produces an additional M bits of resolution in the data signal. For example, if M=3, the receiver functions as a 6-bit ADC, with additional slicers triggering at levels between each of the eight PAM-4 sub-eyes (e.g. above +3, +3 to +2, +2 to +1, etc.).

In some implementations, offset correction may applied at the receiver input termination, to correct for device-mismatch-induced DC offset in the analog front end, and to correct for baseline wander or low-frequency impairments (particularly in an optical implementation). In order to correct these offsets, a high-bandwidth decision-directed loop (DD-LF) may be used in conjunction with a low-bandwidth loop.

The low-bandwidth loop may be used to correct for device-mismatch-induced DC offset in the input termination, the CTLE, and the first variable gain amplifier. DC offset may be sensed at the output of the first variable gain amplifier using a low-pass filter (LPF), a low-offset or auto-zero comparator, and an integrator, which can be implemented in the analog domain or in the digital domain. In implementations in which the integrator is implemented in the digital domain, a digital-to-analog converter (DAC) may be used to convert the digital integrator output back to the analog domain.

For the high-bandwidth DD-LF loop, which feeds back from a point downstream of the decision stage (such as output of the DSP), high tracking bandwidth (~4 MHz) is achieved by using data and error decisions to track offset caused by baseline wander or low-frequency optical impairment. The DD-LF offset correction may applied at the input termination using a DAC, as in the case of the low-bandwidth offset loop. A dedicated digital-to-analog interface may be provided to minimize DD-LF tracking loop latency. To prevent interaction between the two offset loops, the decision-directed control loop may include a programmable leak to null the DD-LF response within the bandwidth of the low-bandwidth offset loop.

Like most time-interleaved systems, the performance of the time-interleaved array described in this disclosure may be sensitive to random and systematic skew of the sampling clocks, especially the clock signals controlling the interleaver sampling switches. To mitigate clock skew, each clock phase may include a controllable/programmable delay line which can be adaptively set to correct skew.

The subject matter of this disclosure may be better understood by reference to FIGS. 1-11.

FIG. 1 is a high-level representation of an implementation of a hybrid analog/digital equalizer 100 incorporated in a high-speed integrated circuit wireline or optical receiver in accordance with the subject matter of this disclosure. The receiver receives transmitted channel data 111 from channel 101, which may be, e.g., a wireline channel or an optical fiber channel. As discussed above and described in more detail below, received channel data 111 is first processed through analog front-end 102, and then through analog equalizer circuitry 103.

The resulting equalized data is digitized by decision circuitry 104, which determines the data level of each "bit." Decision circuitry 104 which may include optional optical enhancement circuitry 114 as discussed above and described in more detail below. In some implementations, the integrated circuit incorporating receiver 100 includes optical enhancement circuitry 114 whether it is used or not. In some of those implementations, activation of optical enhancement circuitry 114 is controllable by a user setting or even by a run-time command, and the decision to use, or not use, optical enhancement circuitry 114 may be made by the user at the time of device configuration or even at run-time. In others of those implementations, the decision to use, or not use, optical enhancement circuitry 114 is made at the time of device fabrication, based on end-user requirements, by making appropriate metallization connections in metallization layers of the integrated circuit device.

Finally, whether or not optical enhancement circuitry 114 is in use, the equalized digitized data is processed in digital signal processor 105 to yield received data 106. DSP 105 also provides control signals 115 to adapt analog equalizer circuitry 103, and to control decision device 104 and optical enhancement circuitry 114.

Figure 2:
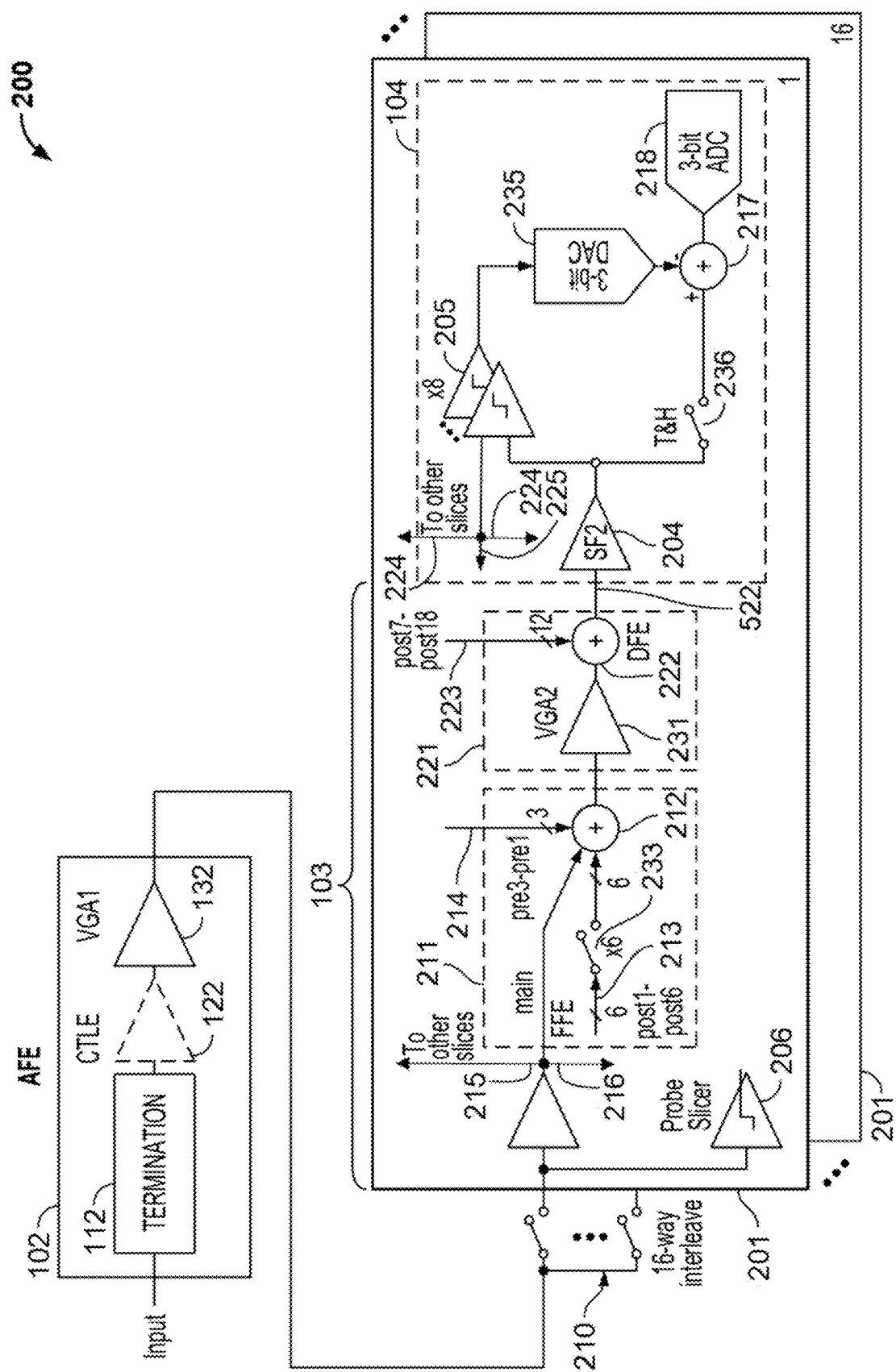
FIG. 2 shows more detail of an implementation of a hybrid analog/digital equalizer, such as that of FIG. 1, in accordance with the subject matter of this disclosure.

FIG. 2 shows more detail of an implementation 200 of a hybrid analog/digital equalizer, such as that of FIG. 1, in accordance with the subject matter of this disclosure. AFE 102 includes a termination block 112 for impedance matching between channel 101 and hybrid analog/digital equalizer 200, to minimize reflections at the interface to channel 101. An attenuator may be built into termination block 112, and the attenuator may have more than one attenuation setting.

For example, in some implementations, termination block 112 may have a variable impedance of, e.g., between 50Ω and 100Ω. Variable termination impedance can be optimized to minimize reflection at the device input and to compensate for process variation of the termination impedance. Passive attenuation may be built in at the input termination and used to optimize the signal level at the AFE input for noise and linearity. One example implementation used for wireline applications may support attenuation levels of 0 dB, 4 dB, 7 dB and 11 dB. Another example implementation used for optical applications may support attenuation levels of 0 dB and 4 dB.

In some implementations, the variable attenuation may be programmably selectable by a user, such as during configuration or even at run-time. However, to reduce power consumption, several specific attenuation values may be incorporated in semiconductor layers of the integrated circuit device at the time of manufacture, and a specific value would then be selected at the time of manufacture, according to the intended use, by applying appropriate metallization connections in one or more metallization layers of the device. The attenuation selection would be made to bring an incoming signal, whose amplitude may vary significantly over different transmitter modules, to within an amplitude range of subsequent portions of the circuit.

AFE 102 may also optionally include a continuous-time linear equalizer (CTLE) 122 configured to compensate for frequency dependent loss experienced during transmission through channel 101. CTLE 122 may attenuate lower frequencies, while boosting mid-range and higher frequencies up to the Nyquist frequency. CTLE 122 may be a 1-zero, 2-poles equalizer or a more complex equalizer such as a 2-zeroes, 3-poles equalizer. One implementation of a 1-zero, 2-poles CTLE 122 may provide 0 dB to 6 dB of boost at the mid-range and higher frequencies, and may be adjustable to change the frequency boost profile, including, e.g., the zero location and the amount of peaking. For example, to keep the data eye open, peaking near the center of the eye may be avoided.

As described above in the case of the variable attenuation settings of termination block 112, CTLE 122 may be incorporated in the integrated circuit device at the time of manufacture whether or not it is used in a particular implementation. Whether or not CTLE 122 is activated may be controllable in some implementations by a user setting or even by a run-time command, which may be set during configuration or even issued at run-time. However, as an alternative, to reduce power consumption, the decision of whether or not to turn on CTLE 122 may be made at the time of manufacture, according to the end-user's intended application, by applying appropriate metallization connections in one or more metallization layers of the device.

Following CTLE 122, AFE 102 may include a variable gain amplifier (VGA1) 132. The amount of gain provided by VGA1 132 may vary depending on whether or not CTLE 122 is included or disconnected/bypassed. In one implementation where CTLE 122 is in use, VGA1 132 may provide between 0 dB and 6 dB of gain.

Following analog front-end 102 is a time-interleaved analog equalization stage 103 including a plurality of identical blocks 201 ("slices" or "interleaves") of equalization circuitry in parallel. In the implementation shown, time-interleaved analog equalization stage 103 includes sixteen "slices" or "interleaves" 201, although the number of interleaves 201 will vary depending on the requirements of particular implementations. The interleaving process is controlled by switches 210, driven by appropriate clock phases—e.g., in this implementation, sixteen clock phases—respectively spaced apart by one unit interval (UI).

Within each interleave 201, FFE circuitry 211 includes a summer 212 which combines, in this implementation, six post-cursor inputs 213 and three precursor inputs 214 from others of the interleaves 201. Sample-and-hold switches 233 may be used as delays to further adjust the timing of post-cursors 213 beyond the delays introduced by interleaving switches 210 (see below) to provide more settling time and ease implementation and/or reduce power dissipation. Signals are output at 215 and 216 to serve as precursors and post-cursors in others of interleaves 201.

Similarly, DFE circuitry 221 may have D=12 taps to equalize twelve post-cursors, including a summer 222 which combines, in this example, twelve inputs 223 including post-cursors 224 from other ones of interleaves 201 and also including decision outputs 225 from decision circuitry 104.

Although particular numbers of taps are described in connection with FFE circuitry 211 and DFE circuitry 221 in this implementation, the numbers of taps in FFE circuitry 211 and DFE circuitry 221 will vary depending on the requirements of particular implementations.

Switches 210 are controlled to provide suitable time delays between the various ones of interleaves 201 allow outputs of each one of interleaves 201 to serve as inputs to FFE circuitry 211 in the current one of interleaves 201 and in subsequent ones of interleaves 201. This allows analog equalization of precursor ISI and post-cursor ISI, where precursors correspond to samples taken from ones of interleaves 201 that are later in time and post-cursors correspond to samples taken from ones of interleaves 201 that are earlier in time In order to compensate for DC loss introduced by the FFE circuitry 211, a second variable gain amplifier (VGA2) 231 may be provided between the FFE circuitry 211 and the DFE circuitry 221 (in this implementation, VGA2 231 may be considered part of DFE circuitry 221). In one implementation, the VGA2 231 may have a gain range of 0 dB to 9 dB, and may be designed to provide at least 40 dB of linearity across the entire gain range using multiple degeneration devices, as described in commonly-assigned U.S. patent application Ser. No. 17/210,080, filed Mar. 23, 2021, which is hereby incorporated by reference herein in its entirety.

As noted, some the inputs to the DFE circuitry 221 are fed back at 225 from decision circuitry 104 of the current one of interleaves 201 and other ones of interleaves 201. A source-follower buffer 204 may drive decision circuitry 104 to help decouple summing node 222, which has a high gain requirement, from the remainder of decision circuitry 104, which may have a large input capacitive load.

Decision circuitry 104 includes at least one slicer 205 configured to determine the data level of each "bit." However, in some implementations, for four-level signal detection, such as in PAM-4, three data slicers 205 (−2, 0, +2) and four error slicers 205 (−3, −1, +1, +3) are used to slice the signal at the desired thresholds. Although one error slicer 205 may be sufficient in some implementations, using four error slicers 205 avoids multiplexing and thereby allows high-bandwidth baud-rate timing recovery. Using multiple error slicers may also speed up adaptation of the FFE circuitry 211, the DFE circuitry 221 and other feedback loops described below.

Each of slicers 205 that operates as an error slicer may be adapted using a decision-directed loop, which sets the corresponding slicer level at the 50th percentile of the conditional error distribution (e.g., conditioned on the PAM-4 data decision). Each of slicers 205 that operates as a data slicer may be adapted offline using a calibration slicer as described in above-incorporated, commonly-assigned U.S. Pat. No. 9,467,315, to determine the signal level at which the probabilities, under the tails of neighboring PAM-4 levels, are equal, within a programmable amplitude range from the signal level to be adapted.

In two-level signaling, such as NRZ signaling, two error slicers may be sufficient. Because the only decision needed is whether a bit is a '0' or a '1', all data slicers can be set to the same threshold to slice the center of the data eye.

Each interleave 201 may also include a probe slicer 206 immediately after the interleaver sampling point (switches 210). Outputs of probe slicer 206 may be processed by the digital signal processor (DSP) in digital portion 105 (see below), to estimate properties of the signal before the signal can be affected by the various gain stages of the analog filter circuitry in the interleave 201. Such properties include, for example and without limitation, amplitude of the signal envelope, inter-symbol interference (i.e., pulse and frequency responses), signal-to-noise ratio, and sampling time skew between interleaves 201. That information allows the DSP to independently optimize the various portions of the analog filter stage and maintain optimal signal level (for SNR and linearity) at the interleaver input. Probe slicer 206, if present, can be implemented as a single-bit slicer with a programmable threshold voltage. To estimate signal properties, the DSP in digital portion 105 controls the threshold of probe slicer 206 and post-processes the probe slicer outputs. In some instances, the DSP may process the probe slicer outputs together with the outputs of data and error slicers 205. For example, the amplitude of the signal envelope can be determined by digitally accumulating the probe slicer output at each of a range of probe slicer thresholds and equating the amplitude of the signal envelope to the probe slicer threshold at which a targeted accumulation total is observed.

Figure 3:
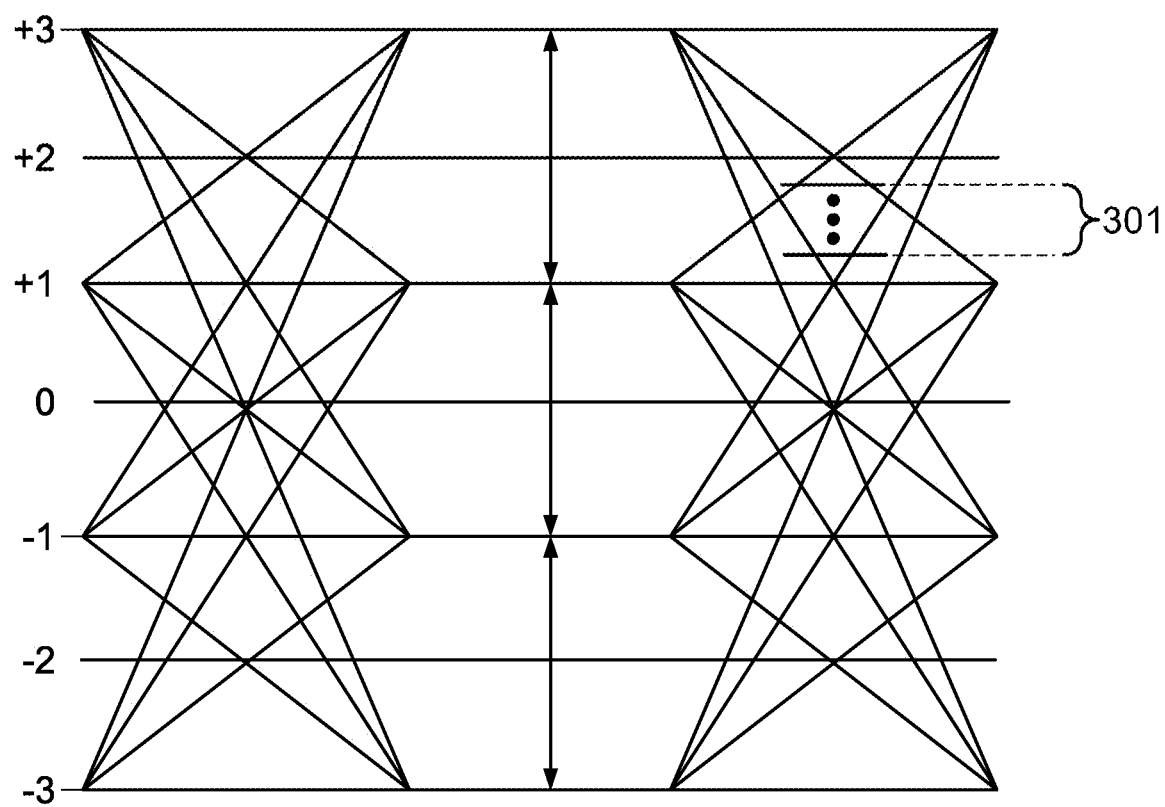
FIG. 3 is a diagram of the signal levels of a PAM-4 signal that may be processed in the hybrid analog/digital equalizer of FIGS. 1 and 2.

PAM-4 signal levels are diagrammed in FIG. 3. The four levels are variously referred to, using different notational systems, as (0, 1, 2, 3), (−1, −⅓, +⅓, +1), or (−3, −1, +1, +3). The latter notation (−3, −1, +1, +3) is used in FIG. 3. Although as few as one slicer may be used, with interpolation and similar techniques, to achieve the four signal levels, in some implementations, three data slicers may be used to provide outputs at −2, 0, +2, which may be further refined to −3, −1, +1, +3 using four error slicers, as described below.

Figure 4:
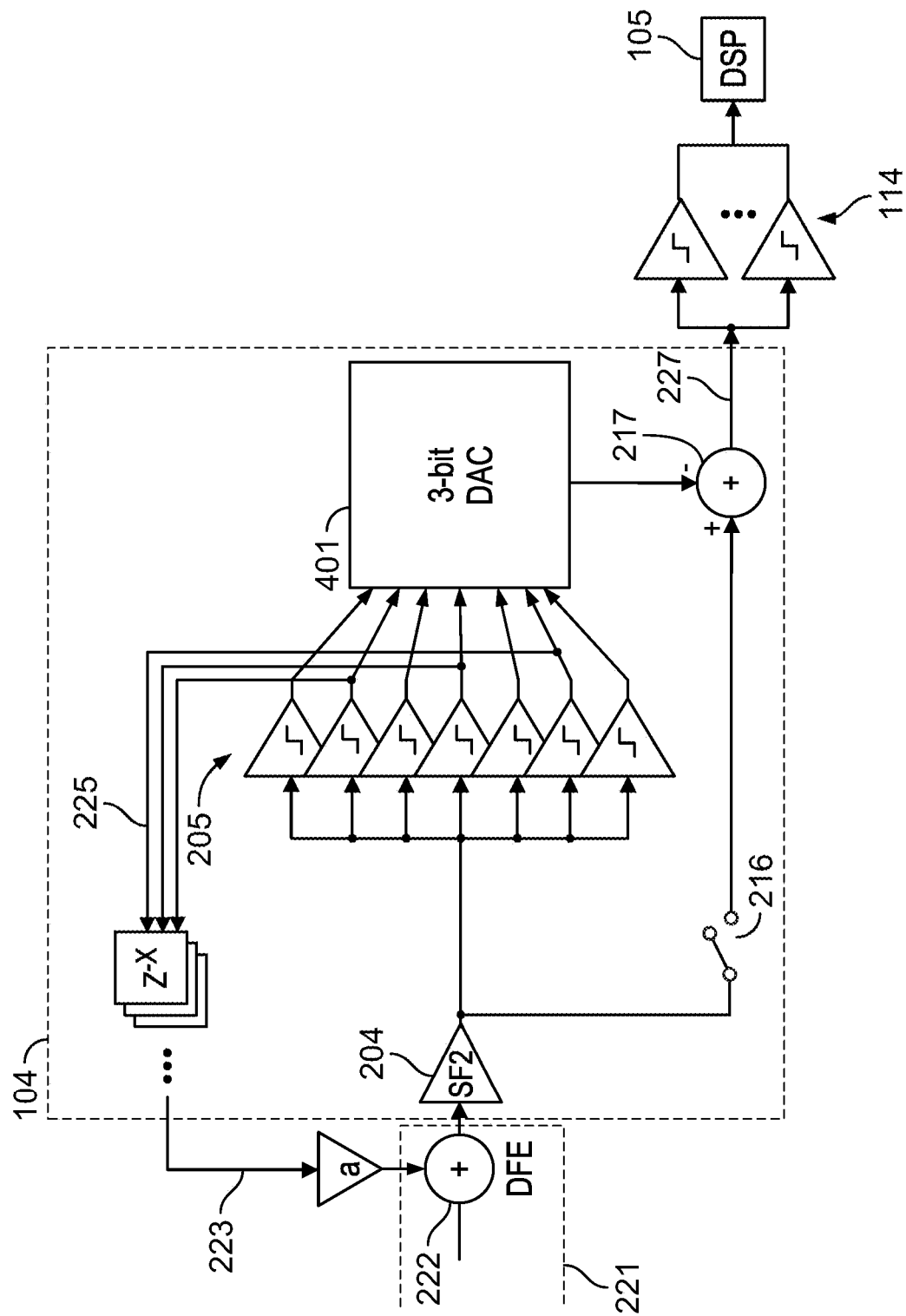
FIG. 4 shows high-level detail of decision circuitry such as that in the hybrid analog/digital equalizer of FIGS. 1 and 2, in accordance with implementations of the subject matter of this disclosure.

FIG. 4 shows high-level detail of decision circuitry 104, including connections to DFE 221 and optional optical enhancement circuitry 114. Decision circuitry 104 includes slicers 205. As discussed above, only seven slicers 205 are needed as shown in FIG. 4 (three data slicers and four error slicers), but as shown below in FIG. 5, eight slicers, including four data slicers and four error slicers may be used. The fourth data slicer, and accompanying multiplexer structure, provides redundancy, allowing each data slicer to be taken off-line—e.g., for calibration or to compute system metrics similar to those provided by probe slicer 206 (except that the measurements are taken after FFE and DFE equalization). The fourth data slicer may also be used as a replacement if one of the other data slicers fails.

The outputs of slicers 205 are converted back to the analog domain in digital-to-analog converter 401 (which in some implementations is the same as digital-to-analog converter 235), and then recombined at 217 with the inputs to slicers 205, which are optionally controllably delayed by transfer-and-hold switch(es) 236. If optical enhancement circuitry 114 is not in use, the recombined signals 227 are not used (and circuitry 217 may be turned off). If optical enhancement circuitry 114 is in use, the recombined signals 227 are quantized and digitized again by optical enhancement circuitry 114, which may function as a 6-bit analogto-digital converter, providing extra resolution to provide additional data levels 301 (FIG. 3)—i.e., additional signal levels between the N levels of the multilevel signaling that is in use.

Figure 5:
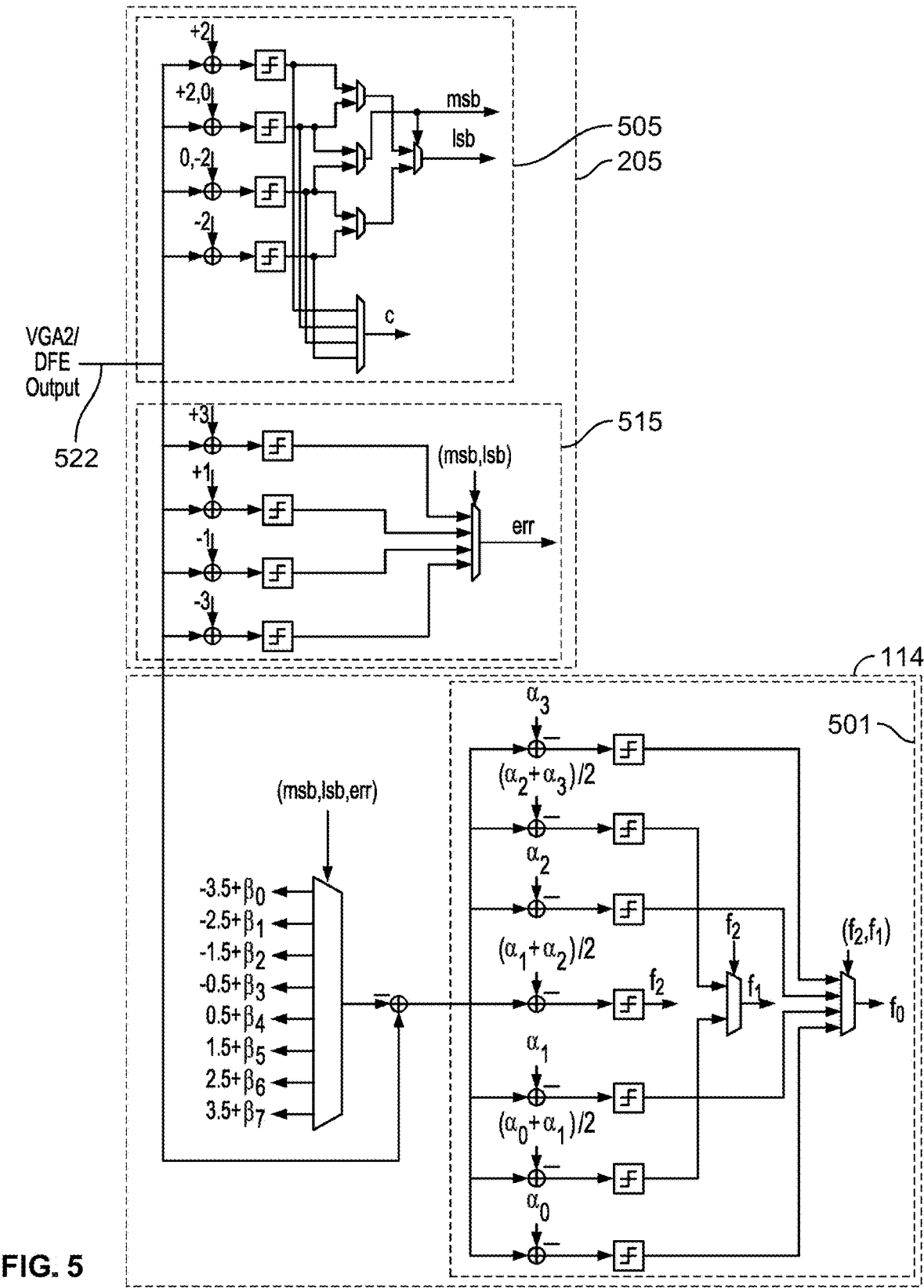
FIG. 5 shows more detail of an implementation of the decision circuitry of FIG. 4, in accordance with the subject matter of this disclosure.
Figure 6:
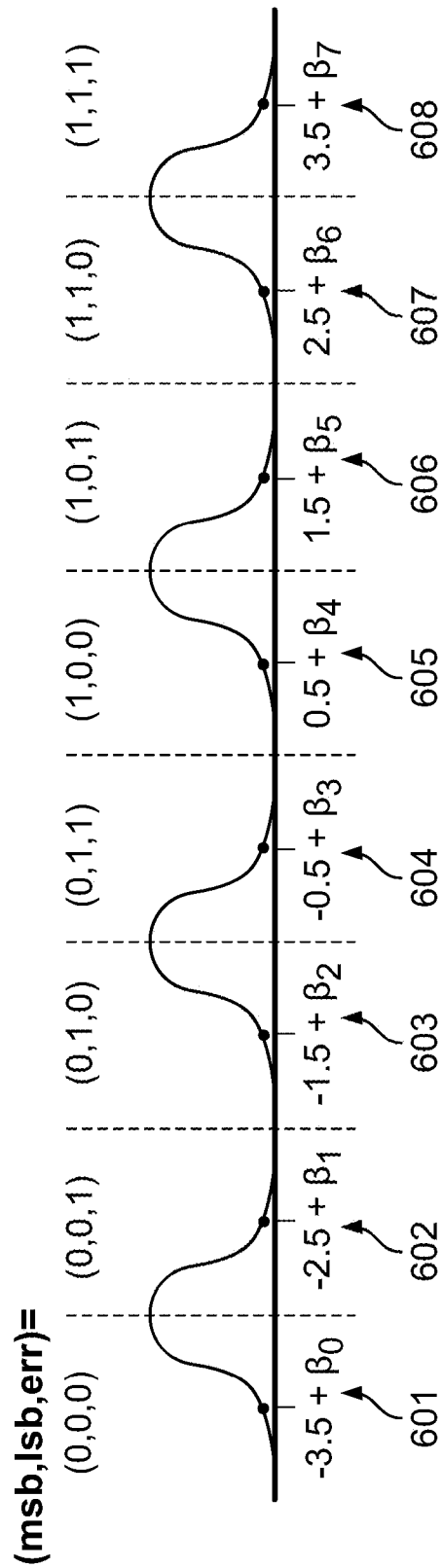
FIG. 6 shows output ranges of the reference signal levels of an implementation of an optical enhancement mode in the hybrid analog/digital equalizer of FIGS. 1 and 2 in accordance with the subject matter of this disclosure.
Figure 8:
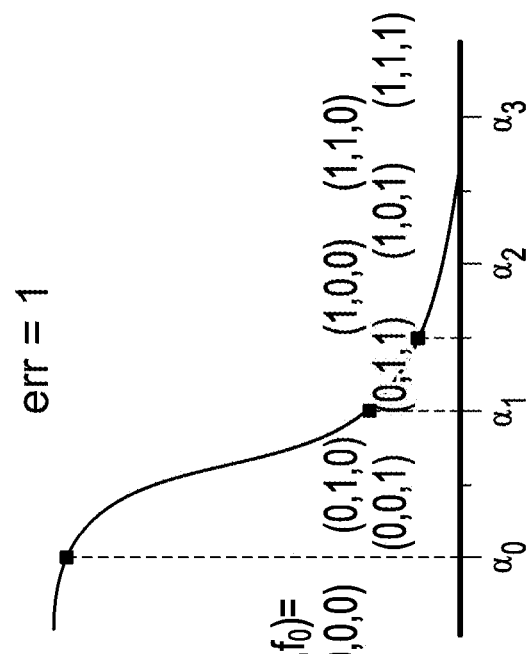
FIG. 8 shows a distribution of the quantized values of a residual signal under the trailing tail of a conditional error distribution in an implementation of the optical enhancement mode of FIG. 6 in accordance with the subject matter of this disclosure.
Figure 7:
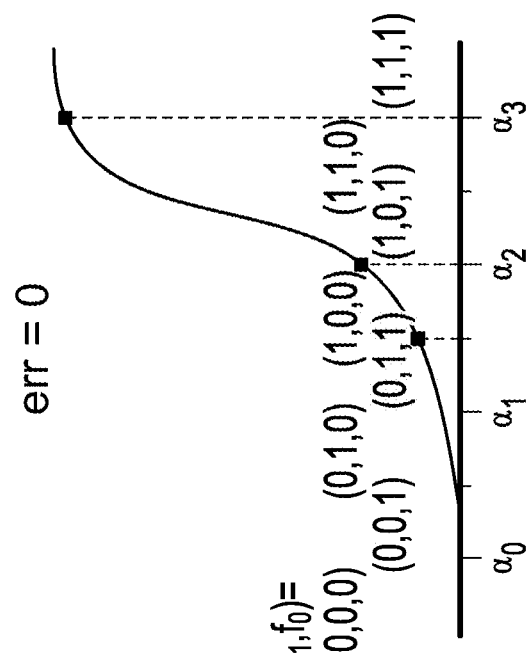
FIG. 7 shows a distribution of the quantized values of a residual signal under the leading tail of a conditional error distribution in an implementation of the optical enhancement mode of FIG. 6 in accordance with the subject matter of this disclosure.

FIG. 5 shows details of the initial data decision slicers 205 of decision circuitry 104 as well as an implementation of the additional slicers 501 of optical enhancement circuitry 114. Decision circuitry 104 functions as the equivalent of a non-uniformly quantizing 3-bit analog-to-digital converter. The levels may or may not be uniformly spaced, depending on whether there is non-linearity in the data eye of the signal. Optical enhancement circuitry 114 may add an additional M bits of resolution to the data signal. For example, if M=3, receiver 100 functions as a 6-bit analog-to-digital converter, with additional slicers 501 triggering at levels between each of the eight PAM-4 sub-eyes (e.g. above +3, +3 to +2, +2 to +1, etc.).

If only decision slicers 205 are in use, data slicers 505 (as noted above, four are shown, including one redundant slicer) compare data signal 522 to the three levels −2, 0, +2 and provide output values msb, lsb, while error slicers 515 compare data signal 522 to the four levels −3, −1, +1, +3 and provide output value err. (msb, lsb, err) can be viewed as the 3-bit analog-to-digital converter output signifying the PAM-4 signal level. A further output c from the off-line, redundant data slicer may be processed by the DSP to adapt the data slicer threshold. Once adaptation is completed, the off-line data slicer is put back on-line and another data slicer may be placed off-line to have its slicing threshold adapted (see above-incorporated, commonly-assigned U.S. Pat. No. 9,467,315).

If optical enhancement circuity 114 is in use, the values msb and lsb from data slicers 505, and err from error slicers 515, are input to multiplexer 514 of optical enhancement circuity 114 to select one of eight output ranges 601-608 (FIG. 6) of the reference signal levels $\beta_0, \beta_1, \beta_2, \ldots, \beta_7$ of the optical enhancement mode. A decision-directed loop that adapts the $\beta_i$ converges to a programmed percentile in the tail of a conditional error distribution (based on the PAM-4 data decision). The target percentiles may be computed offline using the calibration slicer, c, referred to above. For example, the target percentiles could be those that correspond to placing the DAC threshold at the midpoint between two neighboring error/slicer levels.

The output of multiplexer 514 is input to the additional slicers 501, which yield three additional output bits $f_2, f_1, f_0$, based on slicer thresholds $\alpha_0, \alpha_1, \alpha_2, \alpha_3$ that are adapted in manner similar to the $\beta_i$, but using all six bits msb, lsb, err, $f_2, f_1, f_0$. The target percentiles for the $\alpha_i$ adaptations may be those that correspond to uniformly quantizing the residual signal within a sub-eye of interest. Depending on whether err=0 or err=1, the quantized values will be located under the leading tail (FIG. 7; err=0) or the trailing tail (FIG. 8; err=1) of the signal level being quantized.

In some implementations, offset correction may applied at the receiver input termination, to correct for device-mismatch-induced DC offset in the analog front end, and to correct for baseline wander or low-frequency impairments (particularly in an optical implementation). In order to correct these offsets, a high-bandwidth decision-directed loop (DD-LF) may be used in conjunction with a low-bandwidth loop.

Figure 9:
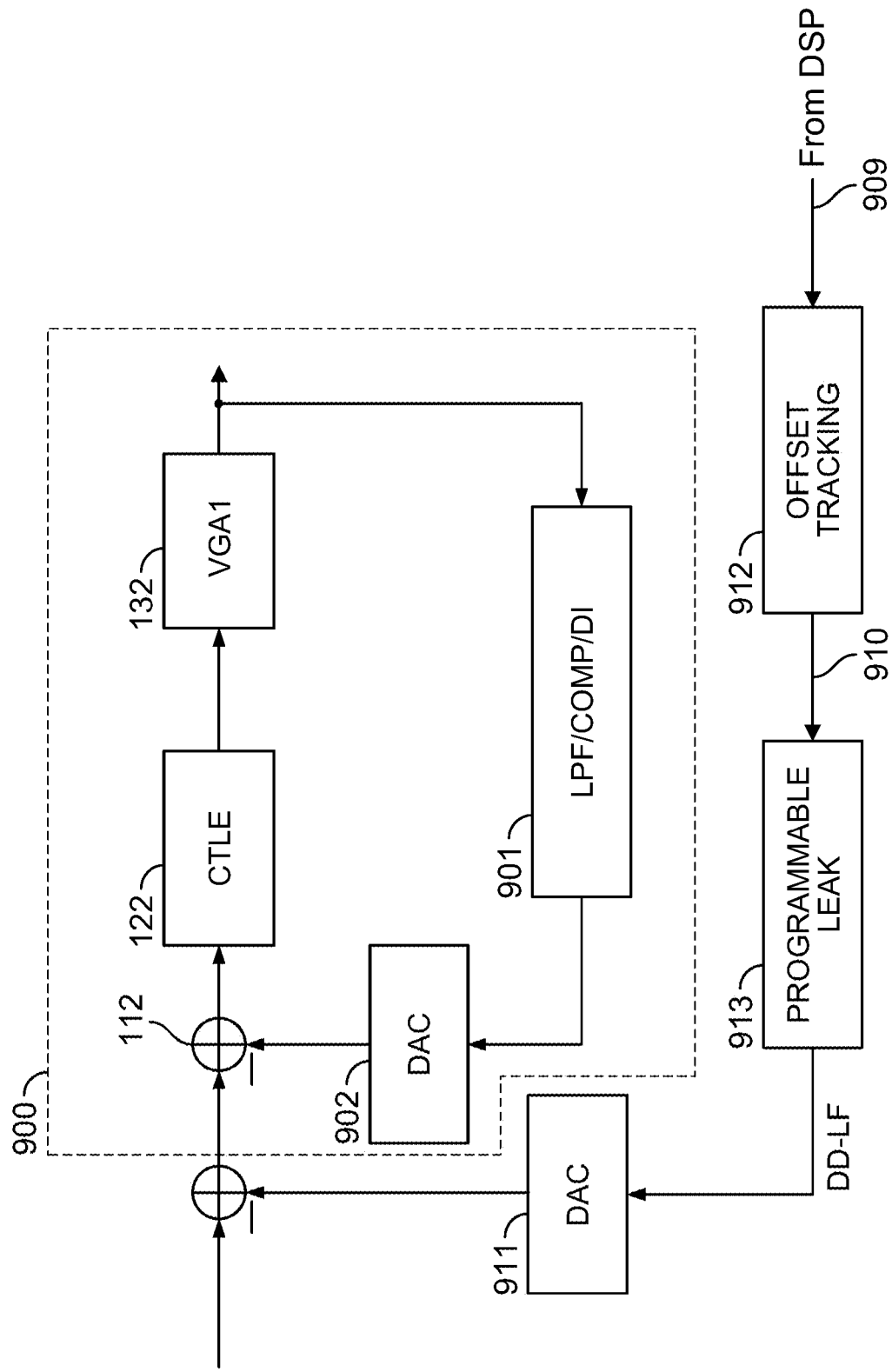
FIG. 9 shows an example of feedback loops for correction of DC offset in an implementation of the hybrid analog/digital equalizer of FIGS. 1 and 2 in accordance with the subject matter of this disclosure.

As seen in FIG. 9, the low-bandwidth loop 900 may be used to correct for device-mismatch-induced DC offset in input termination 112, CTLE 122, and first variable gain amplifier 132. DC offset may be sensed at the output of the first variable gain amplifier using a low-pass filter (LPF), a low-offset or auto-zero comparator (COMP), and an integrator (DI), which can be implemented at 901 in the analog domain or in the digital domain. In implementations in which the integrator is implemented in the digital domain, a digital-to-analog converter (DAC) 902 may be used to convert the digital integrator output back to the analog domain.

For the high-bandwidth DD-LF loop 910, which feeds back from a point downstream of decision device 104, high tracking bandwidth (∼4 MHz) may be achieved by using data and error decisions to track, at 912, the offset caused by baseline wander or low-frequency impairments. The DD-LF offset correction may applied at the input termination using a DAC 911, as in the case of the low-bandwidth offset loop 900. A dedicated digital-to-analog interface may be provided to minimize DD-LF tracking loop latency. To prevent interaction between the two offset loops, the decision-directed control loop may include a programmable leak 913 to null the response of DD-LF loop 910 within the bandwidth of the low-bandwidth offset loop 900. Programmable leak 913 acts like a bandpass filter in that it attenuates the low frequency content. The decision-directed DD-LF loop 910 sees less energy at lower frequencies which reduces the interaction with the low-bandwidth offset correction loop 900, allowing the low-bandwidth loop 900 to correct the low-frequency content.

Figure 10:
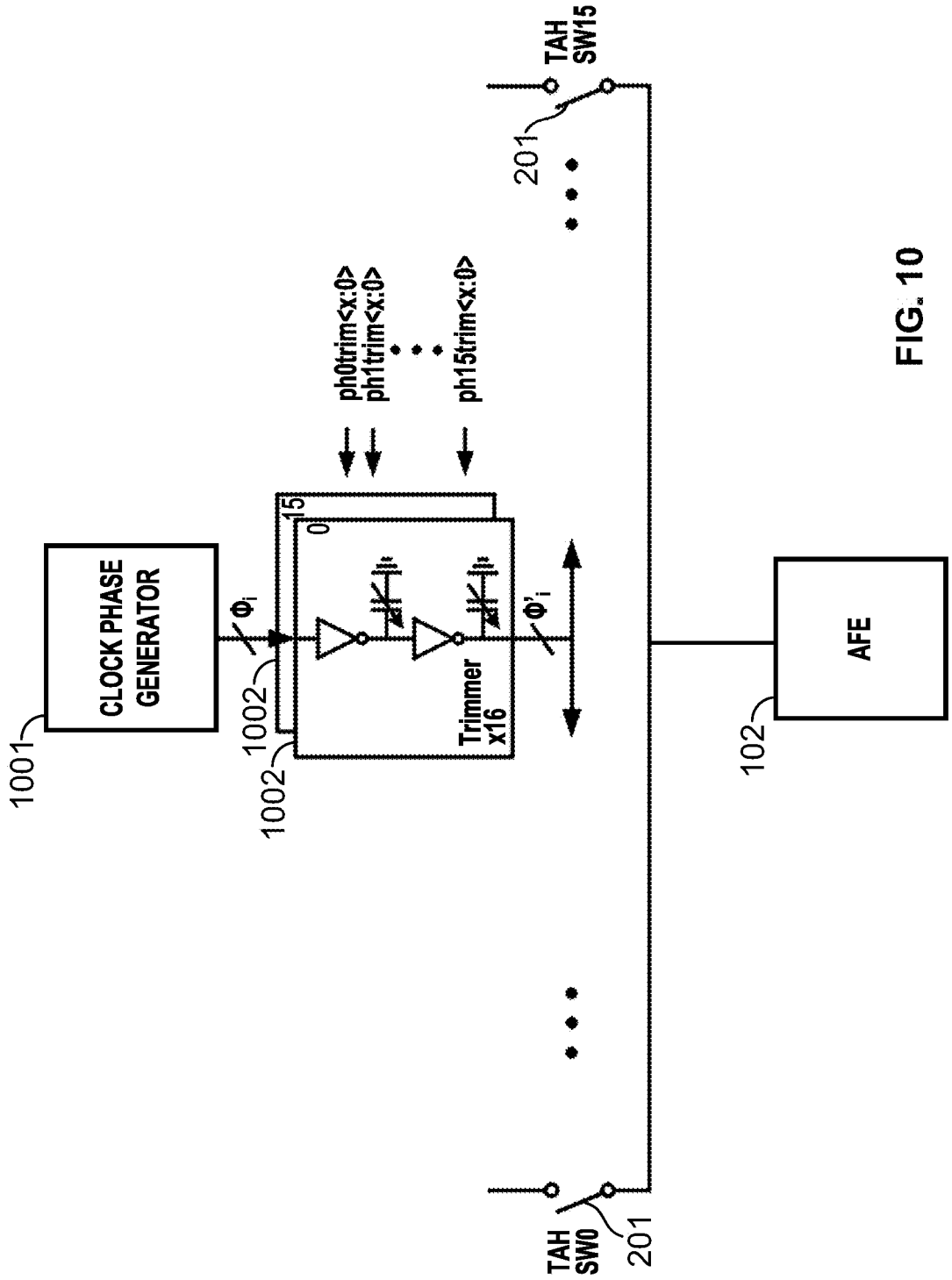
FIG. 10 is a schematic representation of phase trimmer circuitry according to an implementation of the subject matter of this disclosure.

Like most time-interleaved systems, the performance of the time-interleaved array described in this disclosure may be sensitive to random and systematic skew of the sampling clocks, especially the clock signals controlling the interleaver sampling switches. To mitigate clock skew, each clock phase may include a controllable/programmable delay which can be adaptively set to correct skew. For example, as seen in FIG. 10, a suitable clock phase generator 1001 may be provided to generate sixteen input clock phases $\varphi_i$ (i=0, . . . 15)—one for each of switches 210. Sixteen adjustable phase trimmer circuits 1002 are also provided— each for correcting clock skew in one of the respective phases $\varphi_i$, and respectively outputting a corrected phase $\varphi'_i$. Each respective one of phase trimmer circuits 1002 may be adjusted by a respective (x+1)-bit phase trim control signal phintrim<x:0> (n=0, . . . 15).

Figure 11:
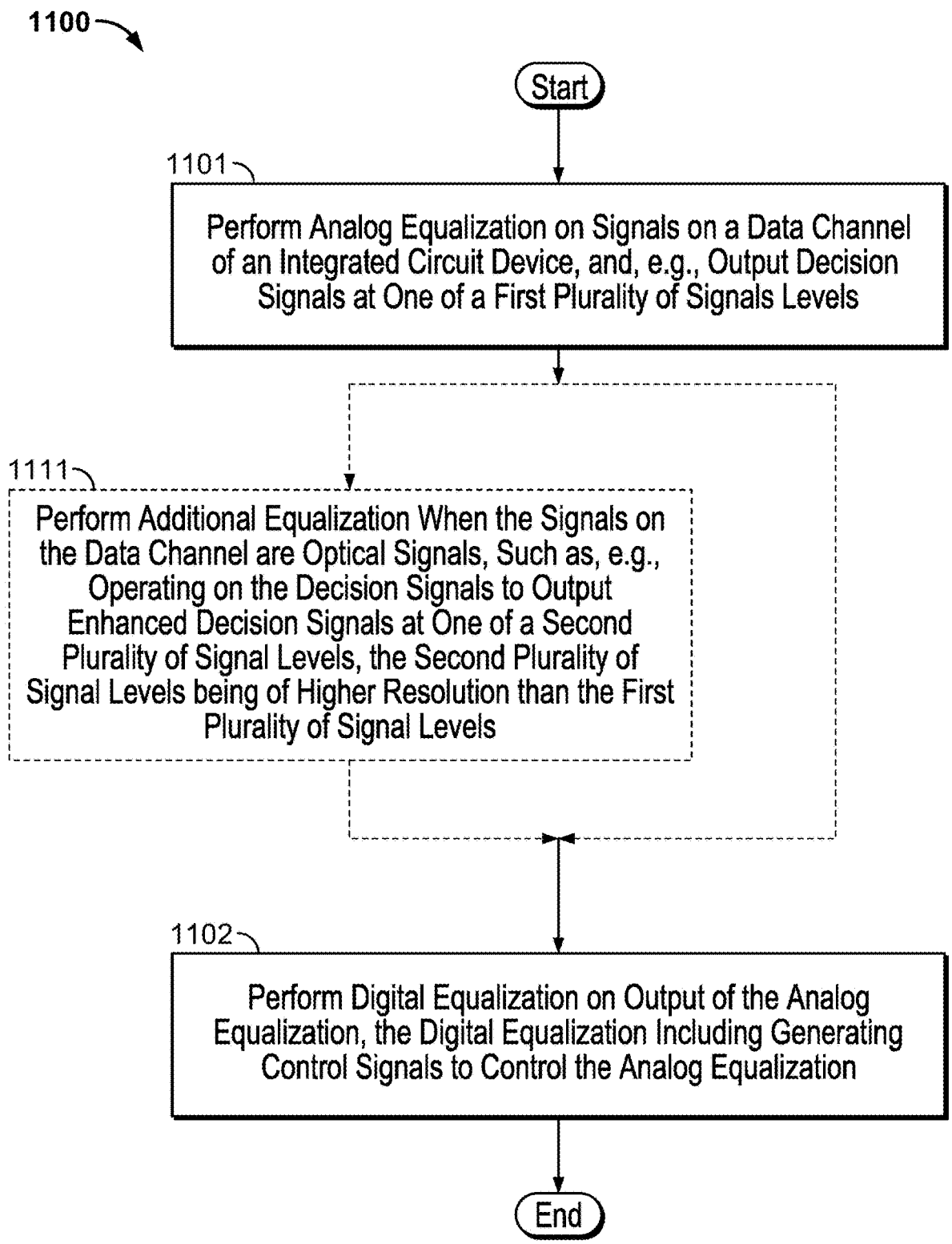
FIG. 11 is a flow diagram illustrating a method according to implementations of hybrid analog/digital equalization according to the subject matter of this disclosure.

FIG. 11 is a flow diagram illustrating a method 1100 according to implementations of this disclosure for equalizing signals on a data channel in an integrated circuit device. Method 1100 begins at 1101 where analog equalization is performed on signals on a data channel of an integrated circuit device. For example, such equalization may output decision signals at one of a first plurality of signal levels.

Optionally, additional equalization may be performed at 1111—e.g., when the signals on the data channel are optical signals. For example, equalization may be performed on the decision signals to output enhanced decision signals at a second plurality of signal levels of higher resolution than the first plurality of signal levels to provide a finer representation of the analog equalizer output.

Next, at 1102—either after 1111, or after 1101 if optional additional equalization is not performed at 1111—digital equalization may be performed on output of the analog equalization, with the digital equalization including generating control signals to control analog equalization and clock recovery circuitry. The digital equalization may include impairment compensation and forward error correction decoding. Method 1100 ends after 1102.

Thus it is seen that hybrid analog/digital equalizers and equalization methods, that can support wireline or optical signals with both feed-forward equalization and decision-feedback equalization, have been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. Equalization circuitry for a data channel in an integrated circuit device, the equalization circuitry comprising:
   an analog equalization circuitry portion coupled to the data channel, including interleaver circuitry configured to disperse incoming signals to a plurality of interleaved equalization blocks, each interleaved equalization block in the plurality of equalization blocks comprising a feed-forward equalization circuitry portion, a decision-feedback equalization circuitry portion and a decision circuitry portion; and
   a digital signal processing circuitry portion downstream of the analog equalization circuitry portion, the digital signal processing circuitry portion being configured to generate control signals to control the analog equalization circuitry portion, the digital signal processing circuitry portion also including a digital equalization circuitry portion configured to operate on an output of the analog equalization circuitry portion; wherein:
   each respective interleaved equalization block in the plurality of equalization blocks comprises a probe slicer configured to output estimated signal properties for use by the digital signal processing circuitry portion, the estimated signal properties excluding effects of analog circuitry in the respective interleaved equalization block.

2. The equalization circuitry of claim 1 wherein the analog equalization circuitry portion further comprises an enhanced processing circuitry portion for optical signals.

3. The equalization circuitry of claim 2 wherein the enhanced processing circuitry portion for optical signals is selectably coupled to the analog equalization circuitry portion.

4. The equalization circuitry of claim 3 wherein selectable coupling of the enhanced processing circuitry portion for optical signals to the analog equalization circuitry portion comprises metallization in the integrated circuit device.

5. The equalization circuitry of claim 2 wherein:
   the decision circuitry portion outputs decision signals at one of a first plurality of signal levels; and
   the enhanced processing circuitry portion for optical signals operates on the decision signals to output enhanced decision signals at one of a second plurality of signal levels, the second plurality of signal levels being of higher resolution than the first plurality of signal levels.

6. The equalization circuitry of claim 5 wherein the feed-forward equalization circuitry portion comprises an analog feed-forward equalization circuitry portion and the feedback equalization circuitry portion comprises an analog decision-feedback equalization circuitry portion.

7. The equalization circuitry of claim 1 wherein:
   at least one of (1) the incoming signals and (2) outputs of at least one of the feed-forward equalization circuitry portion and the decision circuitry portion are configured to be input as at least one of (a) precursors to a feed-forward equalization circuitry portion of a first other interleaved equalization block in the plurality of equalization blocks, (b) post-cursors to a feed-forward equalization circuitry portion of a second other interleaved equalization block in the plurality of equalization blocks, and (c) post-cursors to a decision-feedback equalization circuitry portion of a third other interleaved equalization block in the plurality of equalization blocks.

8. The equalization circuitry of claim 7 wherein each interleaved equalization block in the plurality of equalization blocks comprises a variable gain amplifier configured to compensate for DC loss associated with the feed-forward equalization circuitry portion.

9. The equalization circuitry of claim 1 further comprising:
   an analog front end upstream of the interleaver circuitry; and
   feedback circuitry configured to correct DC offset at the analog front end.

10. The equalization circuitry of claim 9 wherein the feedback circuitry comprises:
    a low-bandwidth feedback loop from an output of the analog front end to an input of the analog front end; and
    a high-bandwidth feedback loop from an output downstream of the decision stage to an input of the analog front end.

11. A method of equalization of signals on a data channel in an integrated circuit device, the method comprising:
    performing analog equalization on the signals on the data channel, including:
    interleaving incoming signals to a plurality of interleaved equalization blocks;
    performing, on signals in each interleaved equalization block in the plurality of equalization blocks, feed-forward equalization and decision-feedback equalization, and outputting equalization signals, and
    estimating, in each respective interleaved equalization block in the plurality of equalization blocks, estimated signal properties for use in digital signal processing, the estimated signal properties excluding effects of analog processing in the respective interleaved equalization block; and
    performing the digital signal processing on an output of the analog equalization, the digital signal processing including generating control signals to control the analog equalization, the digital signal processing also including digital equalization.

12. The method of claim 11 wherein performing analog equalization further comprises performing additional equalization when the signals on the data channel are optical signals.

13. The method of claim 12 wherein:
    performing analog equalization further comprises outputting decision signals at one of a first plurality of signal levels; and
    performing additional equalization comprises operating on the decision signals to output enhanced decision signals at one of a second plurality of signal levels, the second plurality of signal levels being of higher resolution than the first plurality of signal levels.

14. The method of claim 13 further comprises amplifying an output of the feed-forward equalization to compensate for DC loss associated with the feed-forward equalization.

15. The method of claim 11 further comprising:
    inputting at least one of (1) the incoming signals and (2) the output equalization signals as inputs to at least one of (a) precursors to feed-forward equalization in a first other interleaved equalization block in the plurality of equalization blocks, (b) post-cursors to feed-forward equalization in a second other interleaved equalization block in the plurality of equalization blocks, and (c) post-cursors to decision-feedback equalization in a third other interleaved equalization block in the plurality of equalization blocks.

16. The method of claim 11 further comprising using feedback to correct DC offset of an analog front end upstream of the interleaved equalization blocks.

17. The method of claim 16 wherein using feedback comprises:
    feeding back low-bandwidth signals from an output of the analog front end to an input of the analog front end to correct device-mismatch-induced DC offset in the analog front end; and
    feeding back high-bandwidth signals from an output downstream of the decision signals to an input of the analog front end to correct offset caused by one or both of baseline wander and low-frequency impairment.

* * * * *